United States Patent [19]
Ray et al.

[11] Patent Number: 5,466,918
[45] Date of Patent: Nov. 14, 1995

[54] METHOD AND APPARATUS FOR IMAGE COMPRESSION, STORAGE, AND RETRIEVAL ON MAGNETIC TRANSACTION CARDS

[75] Inventors: Lawrence A. Ray; Richard N. Ellson; Bhavan R. Gandhi, all of Rochester, N.Y.

[73] Assignee: Eastman Kodak Company, Rochester, N.Y.

[21] Appl. No.: 145,051

[22] Filed: Oct. 29, 1993

[51] Int. Cl.⁶ .................................................. G06K 19/12
[52] U.S. Cl. .............................. 235/380; 902/5; 382/115; 382/232
[58] Field of Search ................. 902/4, 5, 6; 235/379, 235/380, 382; 380/23; 382/2, 56; 358/433

[56] References Cited

U.S. PATENT DOCUMENTS

| | | | |
|---|---|---|---|
| 3,569,619 | 3/1971 | Simjian | 235/380 |
| 4,712,103 | 12/1987 | Gotanda | 235/382 |
| 4,754,487 | 6/1988 | Newmuis | 382/2 |
| 4,841,575 | 6/1989 | Welsh et al. | 382/2 |
| 4,879,747 | 11/1989 | Leighton et al. | 235/382 |
| 4,995,081 | 2/1991 | Leighton et al. | 235/382 |
| 5,241,600 | 8/1993 | Hillis | 902/4 |
| 5,268,963 | 12/1993 | Monroe et al. | 380/23 |
| 5,321,751 | 6/1994 | Ray et al. | 380/23 |

FOREIGN PATENT DOCUMENTS 2606188  5/1988  France .................. 902/4

OTHER PUBLICATIONS

J. W. Kelley, "Magnetic Encoded Photo Credit Card," IBM Technical Disclosure Bulletin, vol. 21, No. 6, Nov. 1978, pp. 2515–2517.

Robert M. Gray, "Vector Quantization", IEEE ASSP Magazine, vol. 1, Apr. 1984, pp. 4–29.

Primary Examiner—John Shepperd
Attorney, Agent, or Firm—Edward Dugas

[57] ABSTRACT

A transaction card is described in which data representing an identifiable image can be stored in a limited amount of storage space. The image to be stored is converted to an associated matrix of pixel values. The matrix of pixel values is partitioned into a plurality of ordered image portions corresponding to a like partitioning of the image. The partitioning is generally related to feature locations in the image. Each image portion is compared with a reference set of image portions represented by pixel groups. Associated with each pixel group is a signal group. For each image portion, a signal group is chosen for the associated reference pixel group that most closely matches with the pixel image portion. The signal groups representing the matrix of pixel values or the image to be stored are stored as bit patterns on the storage space of a transaction card. The bit patterns may then be read and converted to the signal groups. From the signal groups, a reference pixel group is identified from within a reference set and the reference pixel group is positioned with respect to the image at the same location as the image portion. Using this technique, a recognizable image can be constructed from image information compatible with the ISO-7811/2 standards.

7 Claims, 8 Drawing Sheets

METHOD AND APPARATUS FOR IMAGE COMPRESSION, STORAGE, AND RETRIEVAL ON MAGNETIC TRANSACTION CARDS

FIELD OF THE INVENTION

This invention relates generally to the field of image compression and, more particularly to the apparatus and techniques for producing an image of sufficient quality to enable recognition of a person. The image is stored within the data capacity constraints of a conventional 210 bpi swipe-readable magnetic media such as those described by ISO 7811/2 standards.

BACKGROUND OF THE INVENTION

Many types of transactions and access to services are authorized by the presentation of some form of identification/transaction/access card such as a credit card, debit card, voter registration card, or a health care access card. Many of these cards have incorporated thereon a stripe of magnetic material on which information has been written by the issuer of the card to aid in either access to services and/or identification of the card holder. Such cards are referred to, hereinafter, as transaction cards.

Fraudulent use of transaction cards occurs when an individual presents an unauthorized card issued to another at a transaction point in order to gain access to services or resources. This problem is addressed by the present invention.

Fraud in the credit industry can be used to illustrate the problem. One method of reducing fraud focuses on the confirmation of the identity of the person presenting a card at the transaction point as the individual to whom the card was authorized by the issuer. Images of card holders are useful in this identification process. Images of card holders are now printed on some of the poly-vinyl chloride (PVC) card stock of transaction cards such as the PhotoCard from the Citibank Corporation. This method takes a reflection print included with the credit application, captures the print with an electronic camera to convert it to a color digital format, and then "digitally imprints" the color image with a thermal dye-transfer process onto the PVC.

Transaction cards without images printed thereon are counterfeited today. The addition of the digitally imprinted image of a card holder makes counterfeiting more difficult as card fabrication requires the writing of a false image onto the card. However, imprinting an image alone is not sufficient to prevent card forgery.

The image imprinted on the card with dye is not directly available in digital form, although a similar digital file could be recovered by converting the analog dye densities back to a digital signal by rescanning. The two digital images are unlikely to match exactly, and the process involves color scanning hardware not normally found at the transaction point or other financial transaction locations. In order to use the image information for means other than to deter card fraud, the digital image information has to be stored on the card. Such a recording scheme is disclosed in U.S. Pat. No. 5,321,751 entitled, "Method and Apparatus for Credit Card Verification" by Lawrence A. Ray and Richard N. Ellson, and assigned to EASTMAN KODAK Co., the assignee of the present application.

Magnetic data densities on transaction cards are very low in comparison to modern magnetic media used for computer data storage as in the common 3½ inch micro diskettes. The high-density track of a transaction card has been written with 210 bits per inch on a track less than 3 inches long. Transaction cards are formatted with a maximum of three data tracks, one of which has an even lower density of 75 bits per inch. Total storage capacity if all tracks were high density would be less than 2000 bits, or under 250 bytes. It is desired to only use a single track for digital image storage for several reasons, such as the need to store account information, and keeping the magnetic head assembly inexpensive. Data capacity of single track of the conventional transaction card in use today is less than 600 bits.

Digital images of even relatively modest image size require a significant number of bits to either store or encode uncompressed raw images. Consequently there has been a continuing effort to develop ever more sophisticated image compression methods to reduce the impact of storing digital images. For instance a very small, uncompressed, full color image could easily require nearly 240,000 bits.

Augmenting the data on the card with additional data transmitted to the transaction point has proven impractical. Raising bandwidth of communications to enable transmission of the entire or part of the image would require substantial investment in the communications network in order to maintain quick transaction times and keep down queue times for transaction terminals. Also, since transaction point communications are largely done over existing telephone networks any improvement in bandwidth is largely outside the control of the credit card industry. Current transactions require 1000 bits, and network loading factors are such that even additions of 50% to the transaction size would severely increase customer queue times to the point of being unacceptable.

A need has therefore been felt for an apparatus and a method for storing recognizable image in a small storage area. Specifically, a need has been felt for an apparatus and a method to store a recognizable image on a transaction card which conforms to the ISO-7811/2 standards.

SUMMARY OF THE INVENTION

The present invention is directed to overcoming one or more of the problems set forth above. Briefly summarized, according to one aspect of the present invention, there is provided a system for enabling "identification quality" digital images to be stored completely in compressed form on a single track of a ISO-7811 series magnetic card format.

The system involves the representation of an image by a matrix of pixel values and the partitioning of the matrix of pixel values into a plurality of pixel blocks. Each pixel block is compared against an established set of reference pixel blocks to determine a best match for each pixel block. A plurality of sets of reference pixel blocks are established with each pixel block of the partitioned matrix of pixels being assigned to one of the sets of reference pixel blocks. Each of the sets of reference pixel blocks acts as a codebook for a predetermined subset of the image. By comparison of each extracted pixel block from the original matrix of pixels to its assigned reference pixel blocks, a best match is found and the result is recorded as a signal group. These signal groups, one for each pixel block in the matrix of pixels, provide a compressed representation of the original pixel image. A version of the original pixel image can then be reconstructed by assembling the reference pixel groups identified by the signal groups.

The current invention is a technique of representing a portrait image of an individual with a low number of bits, such that the data capacity of a single recording track of a standard transaction card is not exceeded with those bits. The disclosed image storage system advantageously permits an identifiable image to be stored in a small amount of space. In particular, an identifiable portrait image can be stored on a transaction card within the constraints identified by an ISO-7811/2 standard.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

The details of the formation of the compressed bit stream and the construction of a displayable image that visually represents the captured image will now be addressed. In the instance where the image that is to be represented on the transaction card is a portrait image, the number of bits needed to represent such an image can be reduced by standardization. In the present invention, standardizing the characteristics of the images adds to their predictability. This predictability leads to improved quality and higher compression ratios.

Figure 1:
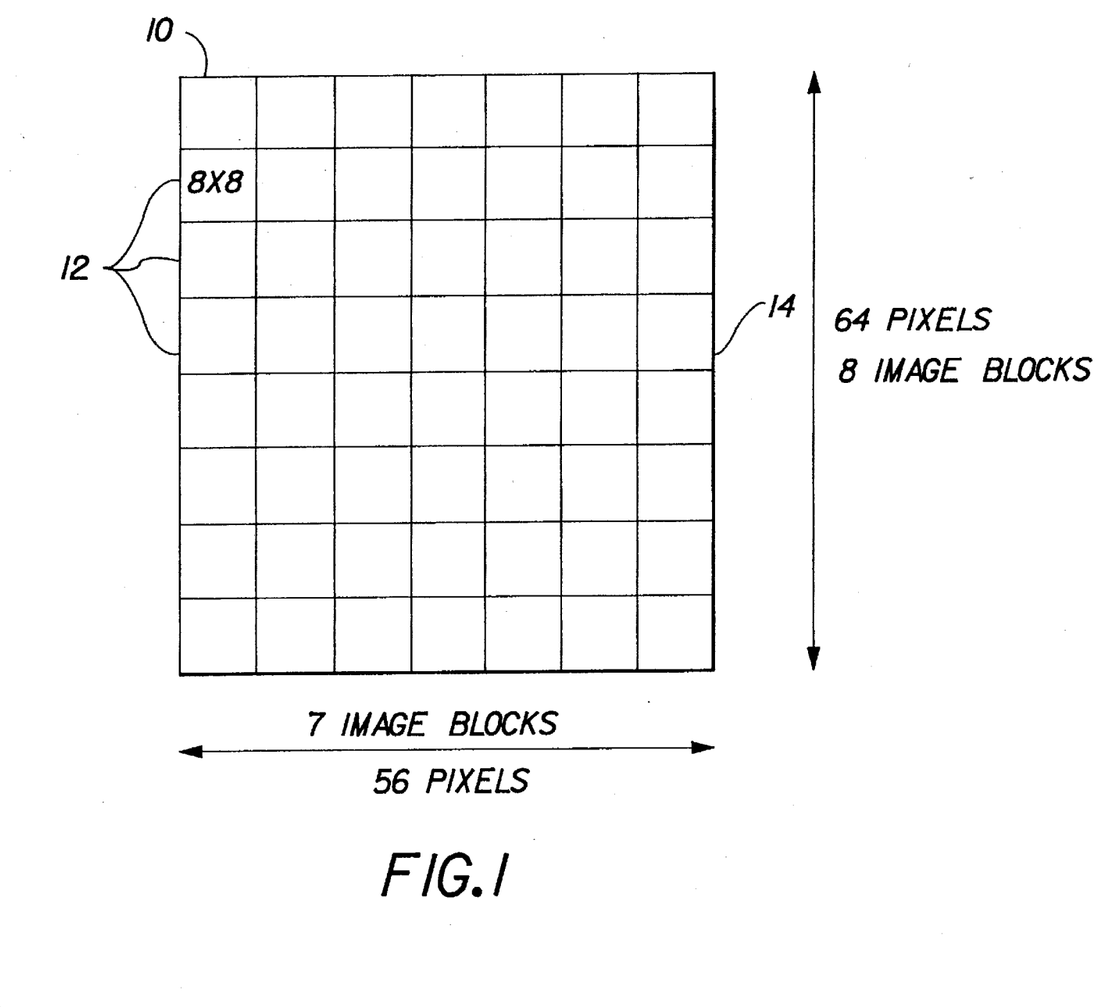
FIG. 1 illustrates the partitioning of a matrix of image pixels into pixel blocks.

Referring to FIG. 1, in the preferred embodiment of the invention, a 56×64 matrix of pixel values 10 is derived from a captured image. The size of the matrix is a function of the storage space allocated for the bits that will be used to represent the captured image. The present invention, as will be described, significantly reduces the number of bits needed to represent the image, but the number still requires a finite storage space. As can be appreciated, the larger the matrix of pixel values the larger the number of bits needed to represent the matrix, and in turn, the larger the storage space required for storing the bits.

The captured image can be transformed into a more suitable image for the purpose of better representing the image in a finite storage space by a process hereinafter called "standardization". The comparison of an area of a captured image against like areas in a collection (set) of similar images is more efficient if all of the like areas are positioned in the same relative position within each image.

A suitable alignment of like areas for a set of images, for example, portrait images would be to locate the eyes of the individual depicted in the portrait image and to reposition both of the eyes to predetermined pixel locations. The eyes are found in the original image either manually or via an automated feature extraction method. Given the pixel coordinates in the original captured image, a transformation to a standardized image is made. (This image manipulation would involve a combination of a translation, zoom, and rotation of the original image.) Another aspect of standardization of the image is to process the matrix of pixel values, the process taking place either before or after the transformation, to enhance contrast and to normalize statistical descriptions of the image. One such process is the well known image processing technique of histogram equalization.

Once standardized, the matrix of pixel values 10 is partitioned into an array of pixel blocks 12 as is done in the conventional process for compression by vector quantization (VQ) (see R. M. Gray, "Vector Quantization," IEEE ASSP Magazine, Vol. 1, April, 1984, pp. 4–29). In the example cited, each of the pixel blocks 12 is shown comprised of 64 pixels in an 8×8 grid. The contents of an individual pixel block in the standardized matrix of pixel values 10 would be expected to have a greater likeness in its content to a pixel block extracted at an identical location in another matrix of pixels having been processed in a similar manner as opposed to a block extracted from a different location. For example, pixel block 14 for a standardized matrix of pixel values representing a portrait image would be likely to contain the upper portion of the left ear, and hence pixel block 14 would have more similar content to other pixel blocks containing the upper portion of the left ear rather than blocks containing the nose or chin.

Figure 2:
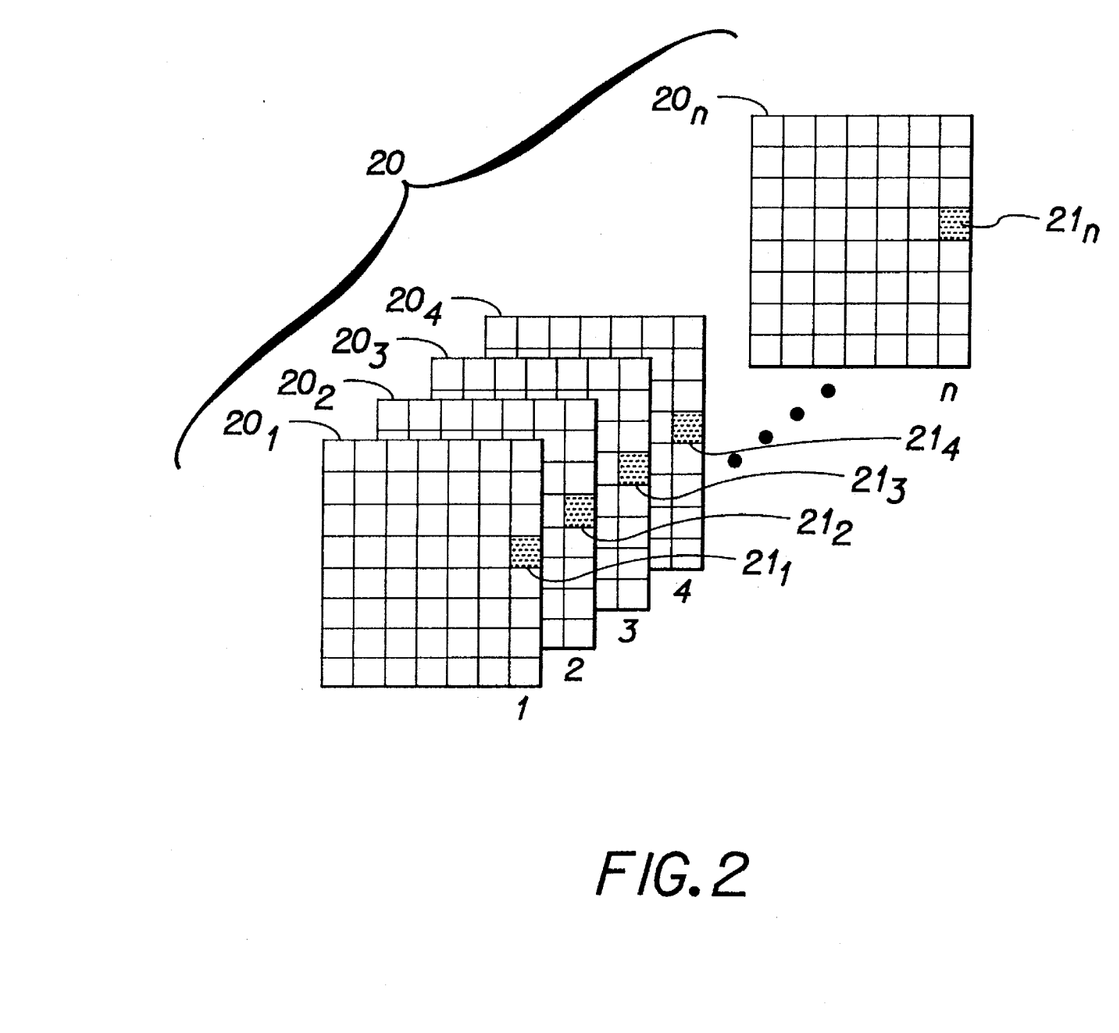
FIG. 2 illustrates the selection of patches, the pixel blocks from like positions within each matrix of pixels belonging to the training set.

Referring to FIG. 2, a set of matrices of pixel values $20_1$ to $20_n$ is formed by standardizing a corresponding number of captured portrait images. This set will be referred to as the training set. A plurality of areas exist within each matrix; one such area, for the purpose of an example and consistency with pixel block 14 of FIG. 1, is defined to be pixel blocks $21_1$ to $21_n$. To differentiate between pixel blocks of the training set and the pixel blocks in the captured image of FIG. 1 the pixel blocks 14 in the training set will hereinafter be called patches.

Figure 3:
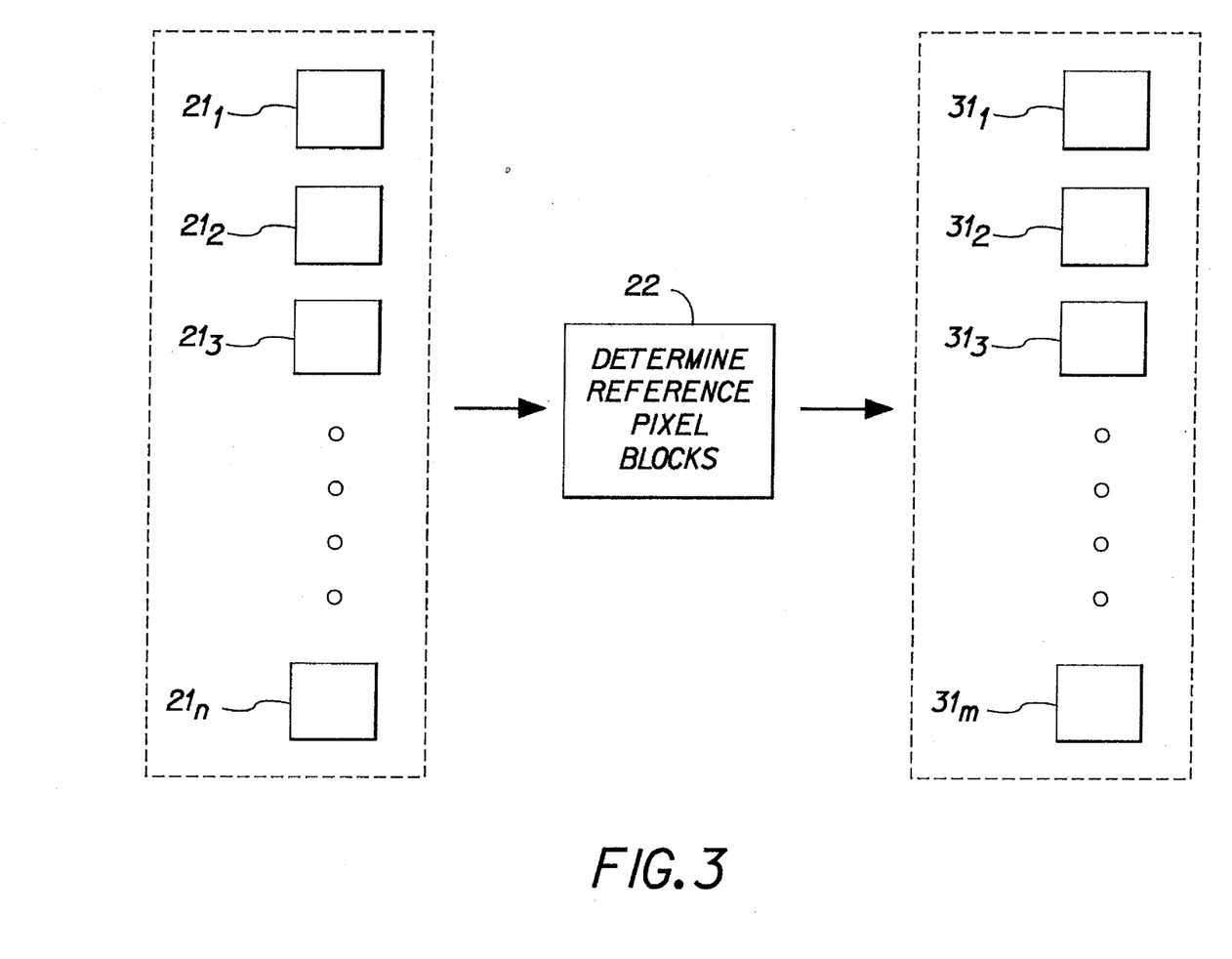
FIG. 3 illustrates the formation of a set of reference pixel blocks from the patches.

Referring now to FIG. 3, the patches $21_1$ to $21_n$ are shown extracted from their respective matrices $20_1$ to $20_n$. In one operable embodiment of the invention, the number n is 2000. Since these patches were extracted from like areas of standardized matrices of pixel values, it is likely that a given patch will be similar to another patch. If some of the patches were removed from the collection, then the remaining patches would still provide an adequate representation of the original set. The ability to closely represent a given pixel block is slightly reduced by using a reduced collection, but the smaller the reduced collection of patches, the smaller the amount of bits required to indicate which patch is the closest representation for the given patch. For example, consider a reduction in the number of patches from the operable embodiment of 2000 down to 128 in the reduced set. This would slightly reduce the accuracy of the best representation by limiting the choices, however, the bits required to store the patch number for the patch best representative of the given patch declines from $\log_2(2000)$ to $\log_2(128)$ or from 11 bits to 7 bits. This decline in the bits for storing the patch number is important in meeting the finite storage requirements mentioned earlier.

This process of approximating the patches $20_1$ to $20_n$ is accomplished in block 22 to reduce the number of patches from n to a smaller set of number m. This smaller set of m patches is shown as the reference pixel blocks $31_1$ to $31_m$. It is not necessary for a patch 31 to actually be identical to a patch 21. Patches $31_1$ to $31_m$ may be chosen as those which are merely the best representation of patches $21_1$ to $21_n$. There are many methods for choosing how to select m representative patches from a collection of n patches where m<n. One standard method of accomplishing this reduction in the number of patches is the Linde-Buzo-Gray (LBG) algorithm which describes the process in terms of codevectors (see Y. Linde, et. al., "An Algorithm for Vector Quantizer Design," IEEE Transactions on Communications, Vol. COM-28, No. 1, January, 1980, pp. 84–95). The number of patches in the reduced collection is determined by the number of bits budgeted for a block. If p bits are budgeted, then the codebook can contain up to $2^p$ patches.

Figure 4:
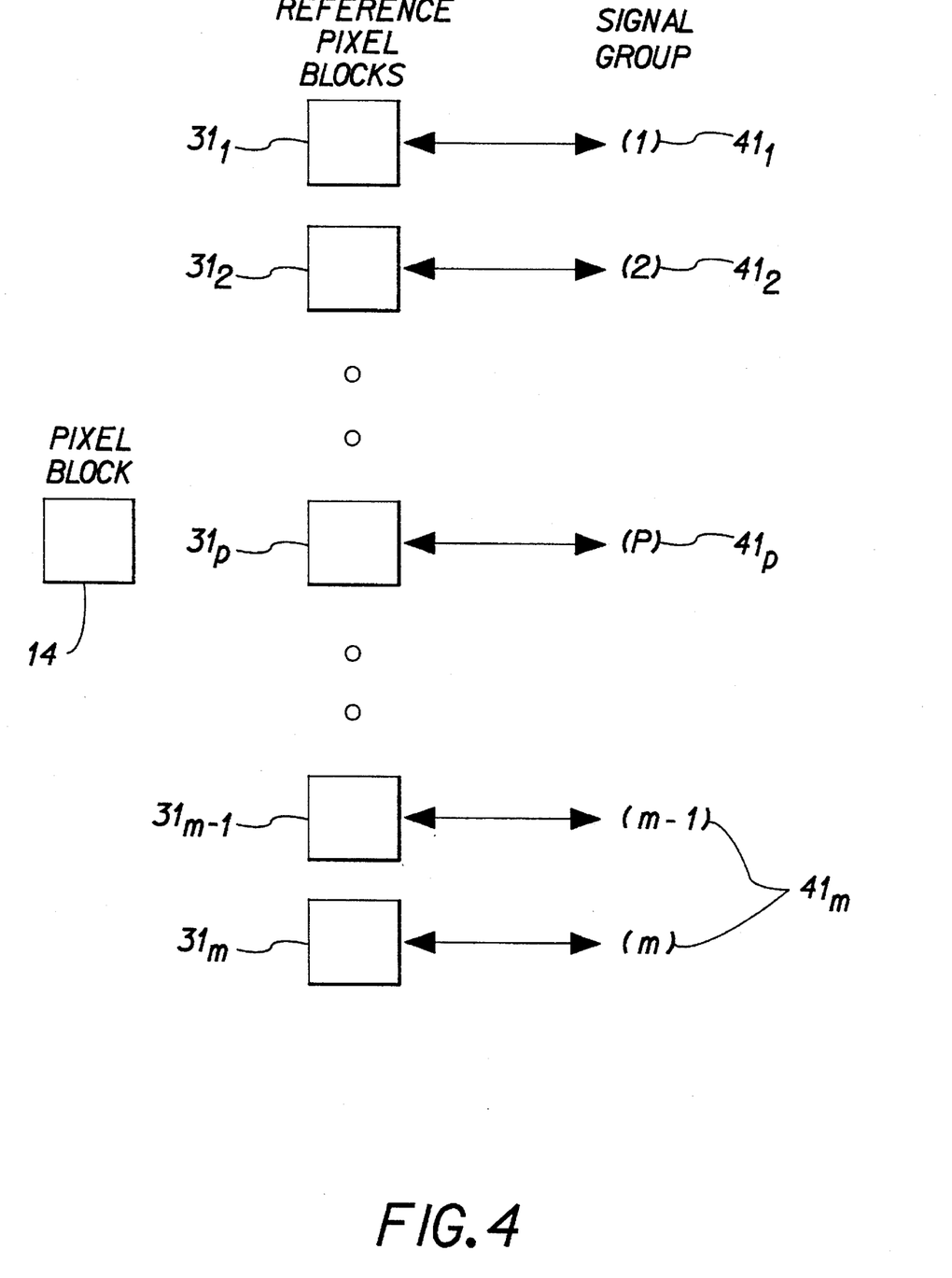
FIG. 4 illustrates the selection of a reference signal group for a pixel block.

Referring to FIG. 4, the pixel block 14, extracted from the partitioned matrix of pixel values 10 (see FIG. 1), is compared to the reference pixel blocks $31_1$ to $31_m$. Each reference pixel block 31 has a signal group 41 associated therewith. As the set of reference pixel blocks 31 do not include all possible pixel combinations, a predetermined comparison criteria is applied to determine the reference pixel block 31 most like the pixel block 14. If, for example, reference pixel block $31_p$ was found to be the best likeness, then signal group $41_p$ is used to identify reference pixel block $31_p$ as the best likeness to pixel block 14.

Figure 5:
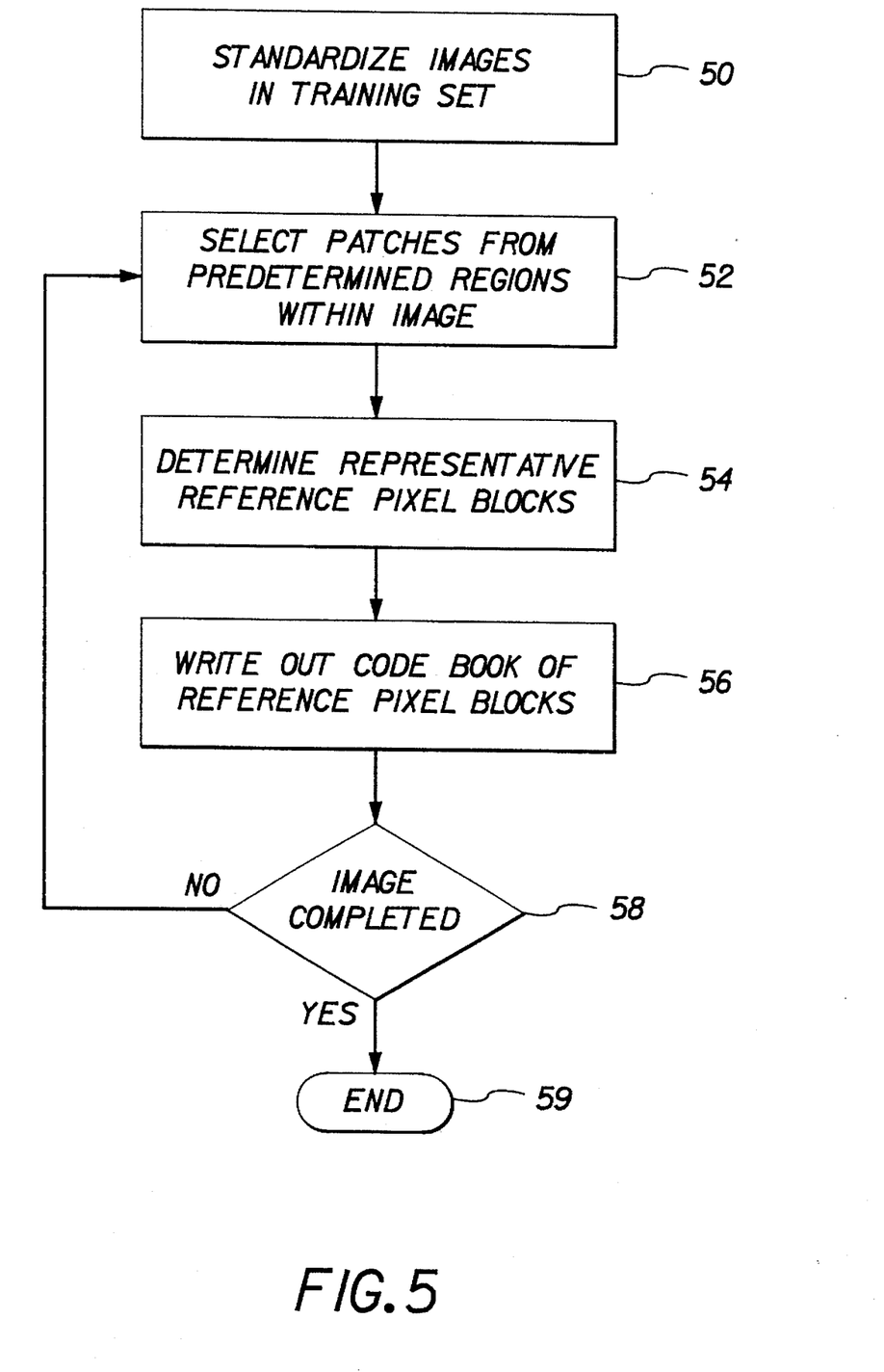
FIG. 5 is a flow chart of the method of forming reference pixel blocks.

Referring to FIG. 5, a block diagram illustrates the method for forming the codebooks of reference pixel blocks. The method requires a process to form a plurality of collections of reference pixel blocks (codebooks) to correspond to the predetermined regions of like content (i.e., the pixel blocks 12 of the matrix of pixel values 10). The flow of the process commences at block 50 with the standardization of the training set images. Then in block 52, patches are selected from a predetermined location in each image in the training set to form the collection of patches, for example, $21_1$ to $21_n$. These patches are used as a basis for the determination of the reference pixel blocks 31, per operating block 54. In block 56, the reference pixel blocks for the current predetermined region are written. In block 58, if there are any remaining predetermined regions for which a codebook of reference pixel block has not been generated, then the process returns to block 52. Otherwise, the process ends with block 59. In this manner, a plurality of collections of reference pixels blocks are formed from patches extracted from predetermined regions of the standardized training set images, and each collection is thus associated with the predetermined region from which it was derived.

Figure 6:
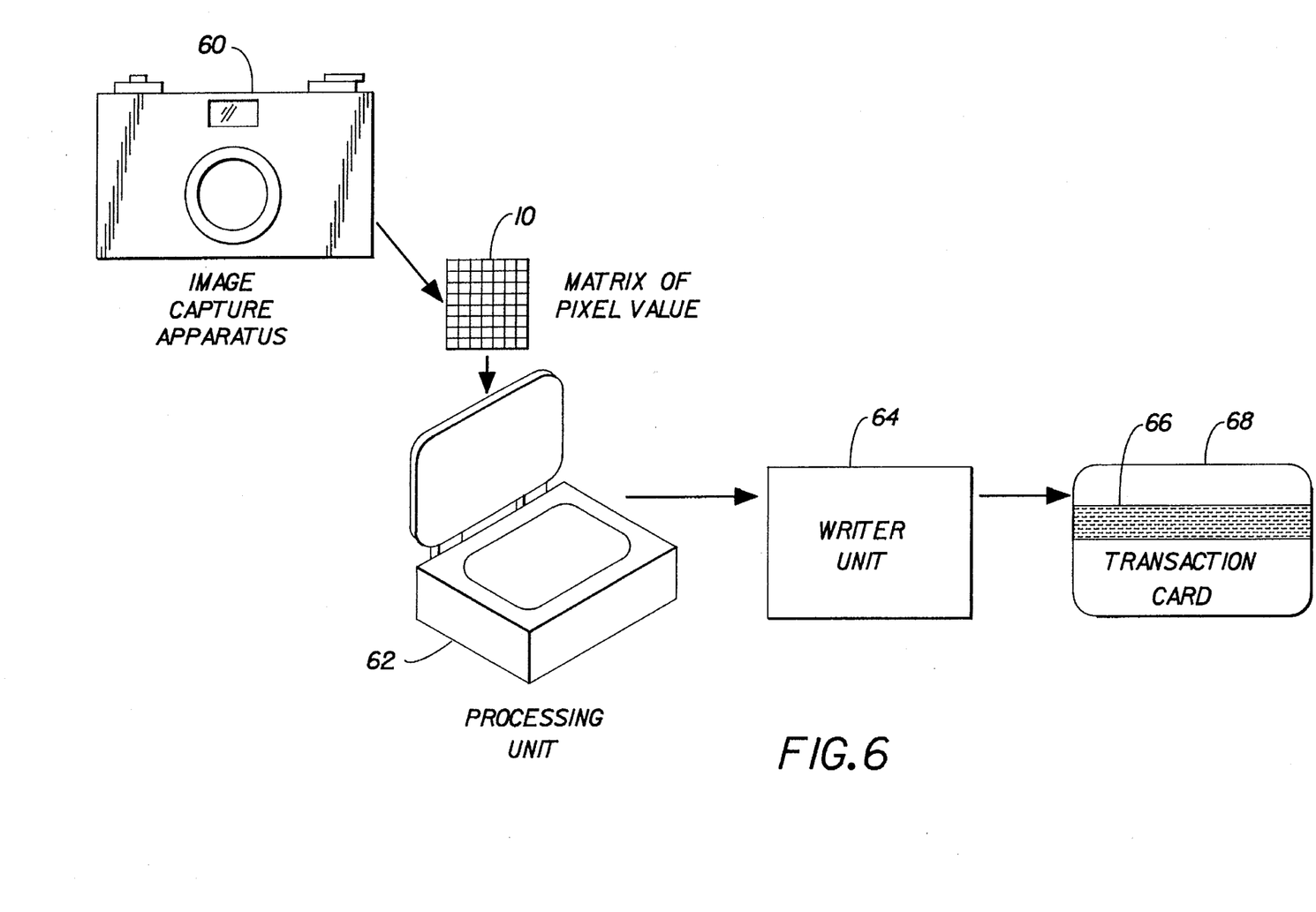
FIG. 6 is a diagram of the apparatus for applying an encoded image on a transaction card.

Referring to FIG. 6, an image capturing apparatus 60, captures the image either in electronic or film form. The captured image is then digitized (converted), if necessary, into the matrix of pixel values 10, (see FIG. 1.) The matrix of pixel values is applied to a processing unit 62, such as a digital computer, wherein the matrix of pixel values is compressed into, or represented as, a bit stream, using the method described above. The resulting bit stream is directed to a writer 64 for outputting onto a storage media, such as the magnetic track 66 of a transaction card 68.

Figure 7:
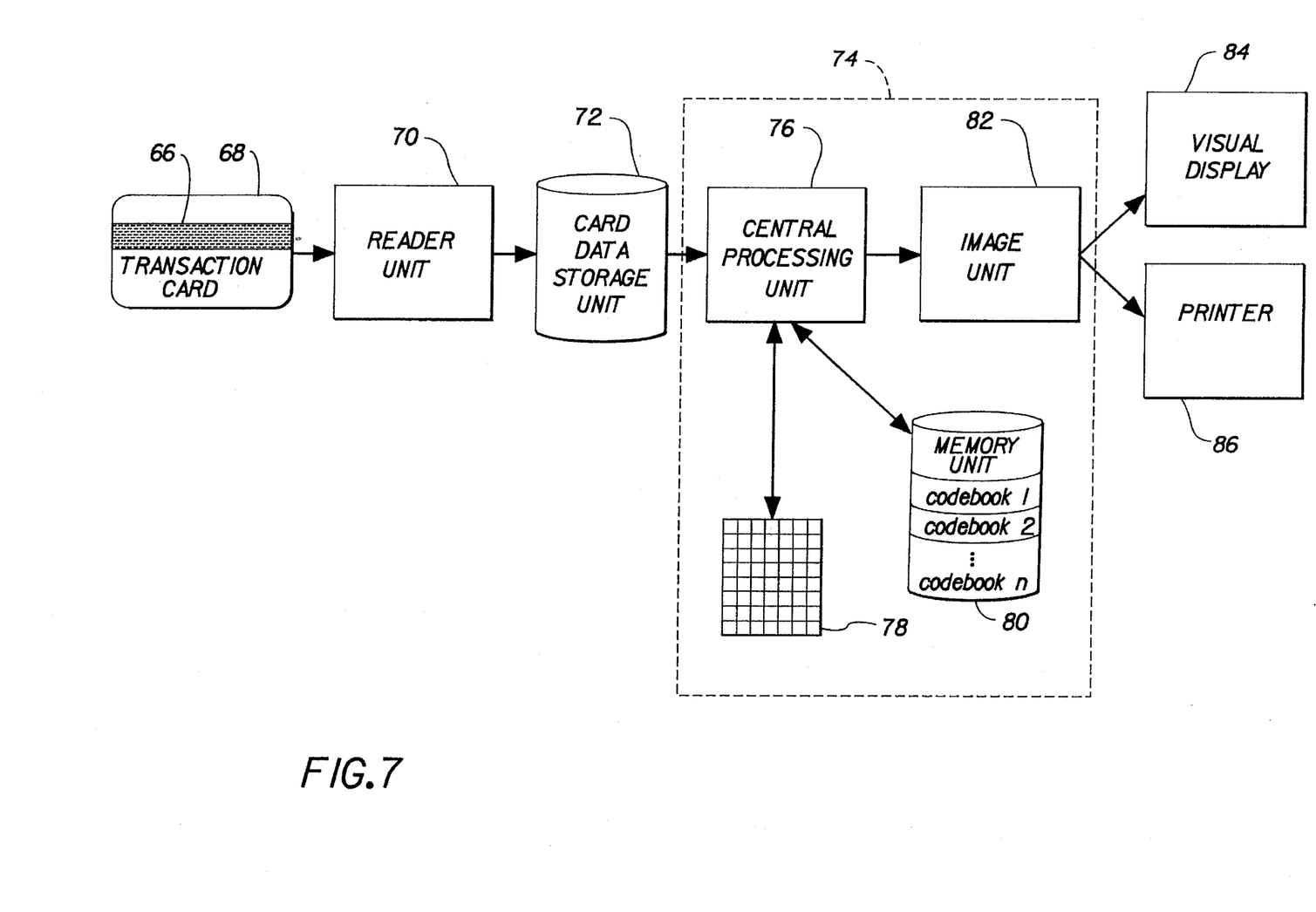
FIG. 7 is a diagram of the apparatus for retrieving an encoded image from a transaction card.

Referring to FIG. 7, an apparatus for retrieving the recorded bit stream from a magnetic track 66 of the transaction card 68 is shown. A transaction card reader 70 recovers the stored bit stream and directs it to a card data storage unit 72 for temporary storage. A processor 74 accesses the stored bit stream from the card data storage unit 72. A matrix of pixel values 78, representing the matrix of pixel values 10 in FIG. 1. is constructed by a CPU 76 accessing reference pixel blocks stored in a memory unit 80. The access is based upon the contents of the bit stream. The constructed matrix of pixel values 78 is transmitted to an image unit 82. The image unit 82 converts the matrix of pixel values 78 into driver signals appropriate for driving a visual display such as a computer monitor 84 and/or a printer 86. Although the processing unit is shown connected to the card data storage unit, it is to be understood that these units may be located at different locations connected together by modem lines or other communication links.

Figure 8:
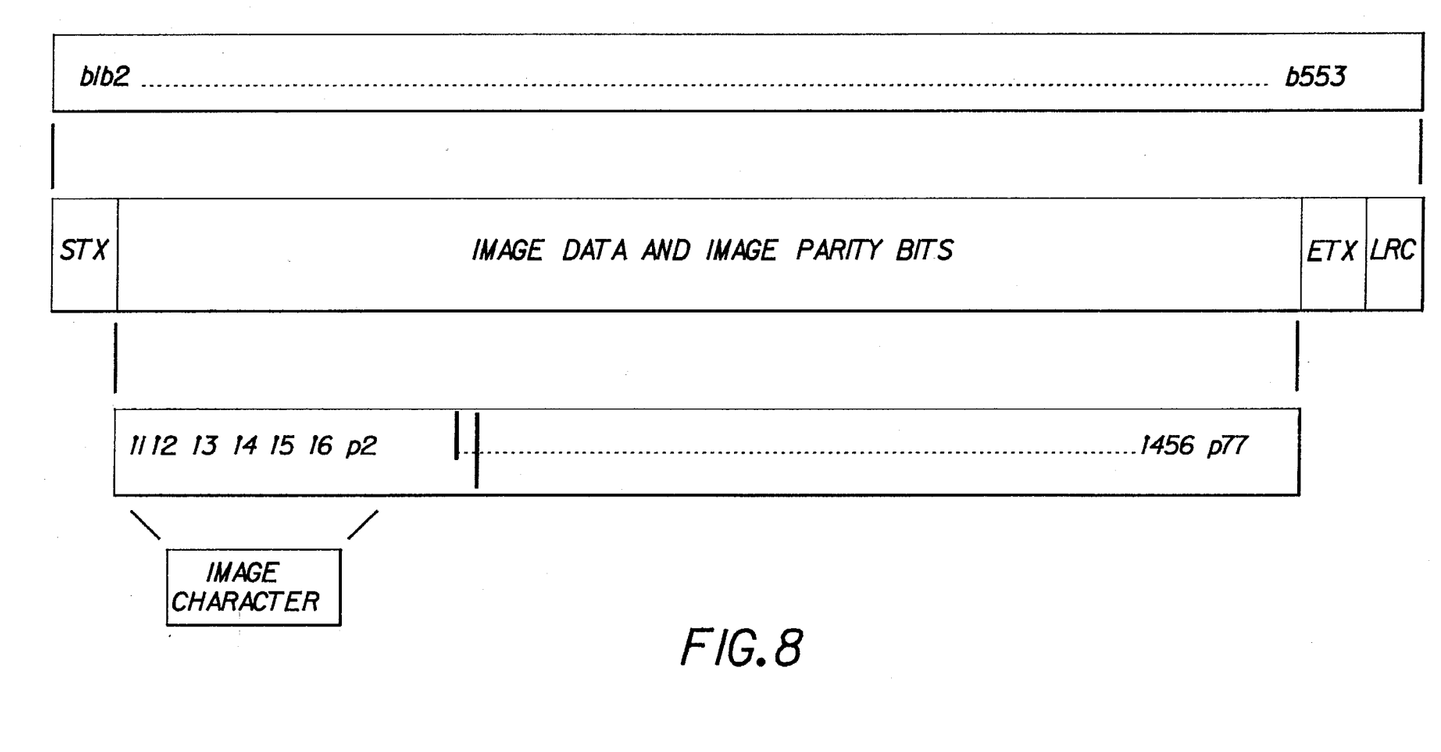
FIG. 8 illustrates an ISO Standard data format for a magnetic stripe on a credit card.

Referring to FIG. 8, the data format structure of the transaction card of the preferred embodiment is shown. ISO 7811 standards for magnetic encoding on credit cards permits up to 79 "characters" where each character is comprised of a seven-bit string. The data format has 553 raw data bits, the $m^{th}$ bit in the resulting string will be denoted by b(m). The first character or first 7 bits is a special character known as a start sentinel (STX) which denotes the start of the string of data bits. Bit b(8) through bit b(539) are known as the image and image parity bits. The image bits are denoted as $i_j$, j=1, . . . ,456, and the parity bits are denoted by $p_k$, k=2, . . . , 77. The image and parity bits are interleaved such that after every sixth image bit there is a parity bit. The seventh bit is determined by the other six bits according to the relationship:

$$P_{k+1} = \left( 1 + \sum_{j=6k}^{5+6k} i_j \right) \bmod 2 \qquad (1)$$

There are two other special control characters, the end sentinel character (ETX) and the longitudinal redundancy check (LRC). Other characters have six data bits and the seventh bit is an odd-parity bit.

As a result the bit stream resulting from the image compression must be parsed with odd-parity bits inserted after every sixth bit in order that the format comply with the ISO standard. The first six bits are determined for the longitudinal redundancy code by:

$$LRC_i = \left( \sum_{k=1}^{76} b_{(i+6k)} \right) \bmod 2 \qquad (2)$$

The seventh bit of the LRC, LRC7, is determined by the equation:

$$LRC_7 = \left( 1 + \sum_{i=1}^{6} LRC_1 \right) \bmod 2 \qquad (3)$$

In some magnetic readers there is an automatic conversion of two input characters being mapped to a single output character. As a result there are three six-bit strings which cannot be included as any of the data values encoded on the magnetic stripe. These characters are encoded as 7, 31 and 62, and referred to as A, B and C.

The present invention is a system for enabling "identification quality" digital images to be stored completely in compressed form on a single track of a ISO-7811 series magnetic card format. This includes the ability to 1) process a portrait image into a compressed image which can be stored within the data storage limitations of the 210 bpi track of a conventional transaction card, 2) transfer data to a magnetic card track, 3) read of the track with a transaction reader, 4) decompress back into the image, and 5) display of the image. Image display can occur, but is not limited to, a printed form on a receipt printer or as a multi-level image on a video display terminal.

If so desired the compressed image could be transmitted over a communications link. The purpose of this would be to transmit the image of a person presenting himself as a cardholder, but for some reason the person does not meet some card validation criteria.

It will be now appreciated that there has been presented an invention in which an image can be retrieved and stored in a relatively small storage space. Because the image is stored on the card itself, image transmission from a central file location is avoided. In addition, because of the small storage capacity required, the image associated with the transaction can be stored at a local transaction site and transmitted, in a compressed or uncompressed form, to a central location only upon the occurrence of an exceptional situation. The system uses commercially available equipment with the exception of the processing equipment for performing the data compression.

While the invention has been described with reference to a transaction card having a magnetic strip thereon, it is apparent that the invention is easily adapted to other storage techniques, such as optical storage techniques in which an image must be stored in a relatively small amount of storage space. Also, while the invention has been described with particular reference to a preferred embodiment, it will be understood by those skilled in the art that various changes may be made and equivalents may be substituted for elements of the preferred embodiment without departing from the spitit of the invention.

Parts List

| | |
|---|---|
| 10 | Matrix of pixel values |
| 12 | Pixel blocks |
| 14 | Pixel block (patches) |
| 20 | Training set matrix of pixel values |
| 21 | Pixel blocks (patches) |
| 22 | Block |
| 31 | Reference pixel block |
| 41 | Signal group |
| 50 | Block |
| 52 | Block |
| 54 | Block |
| 56 | Block |
| 58 | Block |
| 59 | Block |
| 60 | Image capturing apparatus |
| 62 | Processing unit |
| 64 | Writer |
| 66 | Magnetic track |
| 68 | Transaction card |
| 70 | Transaction card reader |
| 72 | Card data storage unit |
| 74 | Processor |
| 76 | Central processing unit (CPU) |
| 78 | Matrix of pixel values |
| 80 | Memory unit |
| 82 | Image unit |
| 84 | Visual display |
| 86 | Printer |

What is claimed is:

1. A method of encoding an image information storage area on a transaction card, the method comprising the steps of:

representing said image by a multiplicity of pixels;

dividing said pixels into pixel groups, wherein said pixel groups are ordered according to a location in said image;

comparing each of said pixel groups with a plurality of reference pixel groups wherein each reference pixel group represents a location, each of said reference pixel groups having a bit group associated therewith;

based on said comparing step, selecting a bit group; and storing each said bit group in a position on said storage area determined by an image location of said associated pixel group.

2. The method of claim 1 wherein said storing step includes the step of storing said bit groups on said storage media in a format compatible with ISO-7811/2 standards.

3. A method of reconstructing an image stored on said storage area of a transaction card according to the method of claim 1:

accessing each of the bit groups stored in the storage region on said transaction card;

converting the bit groups into corresponding reference pixel groups; and arranging each reference pixel group in its ordered location so as to replicate said image.

4. An apparatus for storing a compressed image of an original pixelized feature image on a storage medium, said apparatus comprising:

separation apparatus for separating said pixelized image into a multiplicity of pixel blocks, each of said pixel blocks having an identified positional relationship with said pixelized image;

storage apparatus for storing codebooks of reference pixel blocks, with each of said reference pixel blocks having an identifying signal group associated therewith and each of the reference pixel blocks, within a codebook, representing a feature of the pixelized image;

selection apparatus for comparing each image pixel block with said codebooks of reference pixel blocks, to select a reference signal group based on a criterion for said comparing; and writing apparatus for writing an identifying signal group associated with the selected reference pixel block on said storage medium.

5. The apparatus of claim 4 wherein said storage medium is a magnetic stripe on a transaction card, wherein said identifying signal group is stored on said storage medium in conformance to ISO 7811/2 standards.

6. The apparatus of claim 4 wherein said storage medium is coupled to a transaction card and wherein said original pixelized feature image is a facial image.

7. An apparatus for reading a stored compressed image from a storage medium, said apparatus comprising:

a reading unit for reading a multiplicity of identifying signal groups from said storage medium;

a storage unit having stored therein a plurality of groups of sets of reference pixel elements corresponding to a portion of like original images with the plurality of groups corresponding in number to the number of portions forming the like original images;

a retrieval unit for retrieving from said storage unit reference pixel element sets associated with each of said retrieved identifying signal groups; and an original image replicator for assembling each of the retrieved reference pixel elements in a predetermined image location to form a replicated original image from the assembled reference pixel elements.

* * * * *